(12) United States Patent
Funane et al.

(10) Patent No.: US 10,946,603 B2
(45) Date of Patent: Mar. 16, 2021

(54) BEAD CORE FORMING FORMER

(71) Applicant: Sumitomo Rubber Industries, Ltd., Kobe (JP)

(72) Inventors: Jyunki Funane, Kobe (JP); Eita Kusu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 783 days.

(21) Appl. No.: 15/625,121

(22) Filed: Jun. 16, 2017

(65) Prior Publication Data

US 2018/0009185 A1 Jan. 11, 2018

(30) Foreign Application Priority Data

Jul. 8, 2016 (JP) .............................. JP2016-136140

(51) Int. Cl.
*B29D 30/48* (2006.01)
*D07B 7/16* (2006.01)
*D07B 7/02* (2006.01)

(52) U.S. Cl.
CPC ............. *B29D 30/48* (2013.01); *D07B 7/165* (2013.01); *B29D 2030/487* (2013.01); *D07B 7/02* (2013.01); *D07B 2501/2053* (2013.01)

(58) Field of Classification Search
CPC .............. B29D 30/48; B29D 2030/487; B29D 2030/488; B21F 37/00
See application file for complete search history.

(56) References Cited

U.S. PATENT DOCUMENTS

| | | | |
|---|---|---|---|
| 3,051,221 A * | 8/1962 | Strozewski ............ | B29D 30/48 156/422 |
| 7,976,661 B2 * | 7/2011 | Sata ....................... | B29D 30/48 156/136 |
| 2015/0174841 A1 * | 6/2015 | Nishida .................. | B29D 30/48 242/430 |

FOREIGN PATENT DOCUMENTS

| | | | |
|---|---|---|---|
| JP | 2007-160830 A | * | 6/2007 |
| JP | 2013-78902 A | | 5/2013 |

* cited by examiner

*Primary Examiner* — Geoffrey L Knable
(74) *Attorney, Agent, or Firm* — Birch, Stewart, Kolasch & Birch, LLP

(57) ABSTRACT

An annular bead core forming former is for manufacturing a bead core including a wire array in which a bead wire is helically wound in a width direction of the bead core. The bead core forming former comprises a main body portion having an outer circumferential surface with a circumferential groove extending in a circumferential direction for winding the bead wire and at least one width adjusting portion which moves relatively to the main body portion to changes a width of the circumferential groove.

16 Claims, 6 Drawing Sheets

BEAD CORE FORMING FORMER

TECHNICAL FIELD

The present invention relates to a former for forming bead cores capable of manufacturing bead cores having different widths.

BACKGROUND ART

Figure 6:
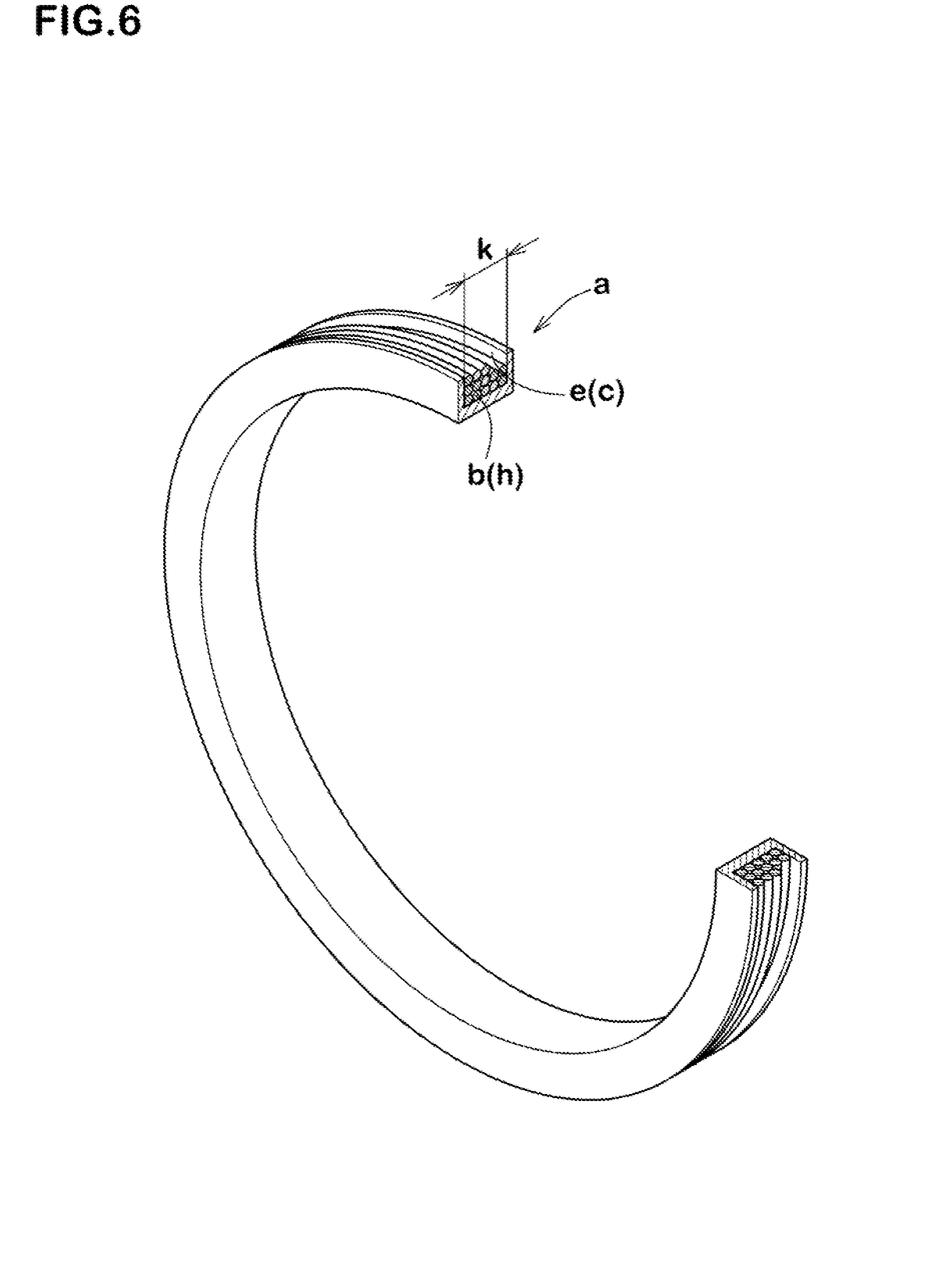
FIG. 6 is a perspective view illustrating a conventional bead core forming former.

There has been known a former (a) having a ring shape with a circumferential groove (b) extending in the circumferential direction, as shown in FIG. 6, for manufacturing a bead core (e) which is a component of a tire (not shown in the figures). The bead core (e) is formed by placing a bead wire (c) on a groove bottom face (h) of the circumferential groove (b) and helically winding the bead wire (c) on an outside thereof in a radial direction of the bead core.

Unfortunately, with the former (a) configured as such, only the bead cores having the same width as a width (k) of the circumferential groove (b) can be manufactured. Therefore, there has been a problem that a plurality of formers (a) having circumferential grooves (b) with different widths (k) is necessary in order to manufacture bead cores (e) having different widths.

SUMMARY OF THE INVENTION

The present invention was made in view of the above, and a primary object thereof is to provide a bead core forming former capable of manufacturing bead cores having different widths by providing a width adjusting portion for changing the width of the circumferential groove.

In one aspect of the present invention, an annular bead core forming former, for manufacturing a bead core including a wire array in which a bead wire is helically wound in a width direction of the bead core, comprises a main body portion having an outer circumferential surface with a circumferential groove extending in a circumferential direction for winding the bead wire and at least one width adjusting portion which moves relatively to the main body portion to changes a width of the circumferential groove.

In another aspect of the invention, it is preferred that the circumferential groove has a groove bottom surface on which the bead wire is placed and at least one recessed portion extending inwardly in a radial direction of the bead core from the groove bottom surface, and the width adjusting portion has a protruding portion for positioning to be fitted with the at least one recessed portion.

In another aspect of the invention, it is preferred that a plurality of the recessed portions is arranged in the width direction of the bead core.

In another aspect of the invention, it is preferred that the at least one width adjusting portion is fixed to the main body portion with a screw member.

In another aspect of the invention, it is preferred that a plurality of the width adjusting portions is provided at intervals in the circumferential direction.

DESCRIPTION OF THE PREFERRED EMBODIMENTS

Embodiments of the present invention will now be described in conjunction with accompanying drawings.

Figure 1:
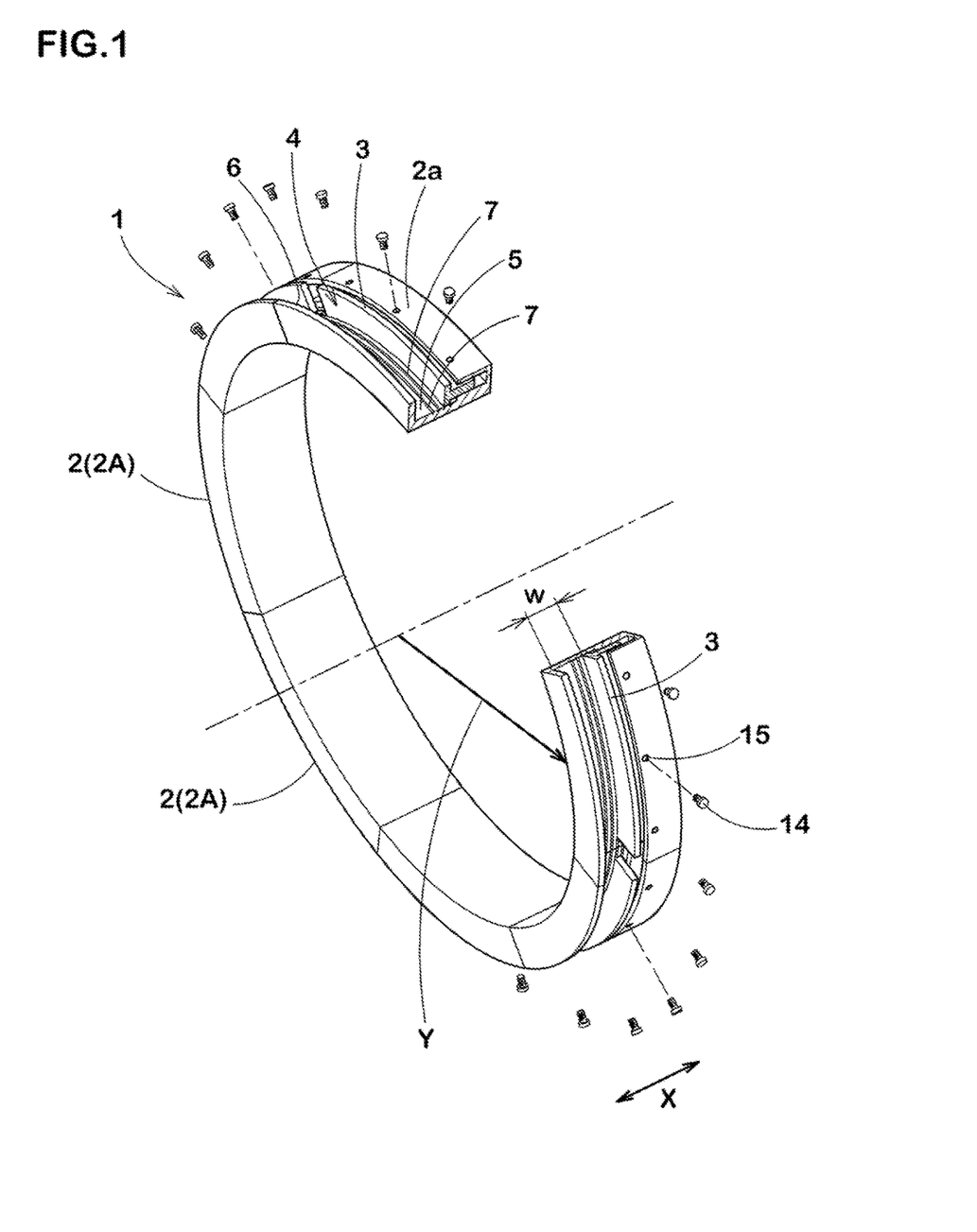
FIG. 1 is a perspective view of the bead core forming former of first embodiment of the present invention.

FIG. 1 is a perspective view of a bead core forming former (hereinafter may be simply referred to as "former") 1 in first embodiment. The former 1 is for manufacturing a bead core 20 (shown in FIG. 2) which is a component of a tire (not shown in the figures). The former 1 in this embodiment can manufacture the bead cores 20 used for various tires such as for passenger cars and motorcycles, for example.

Figure 2:
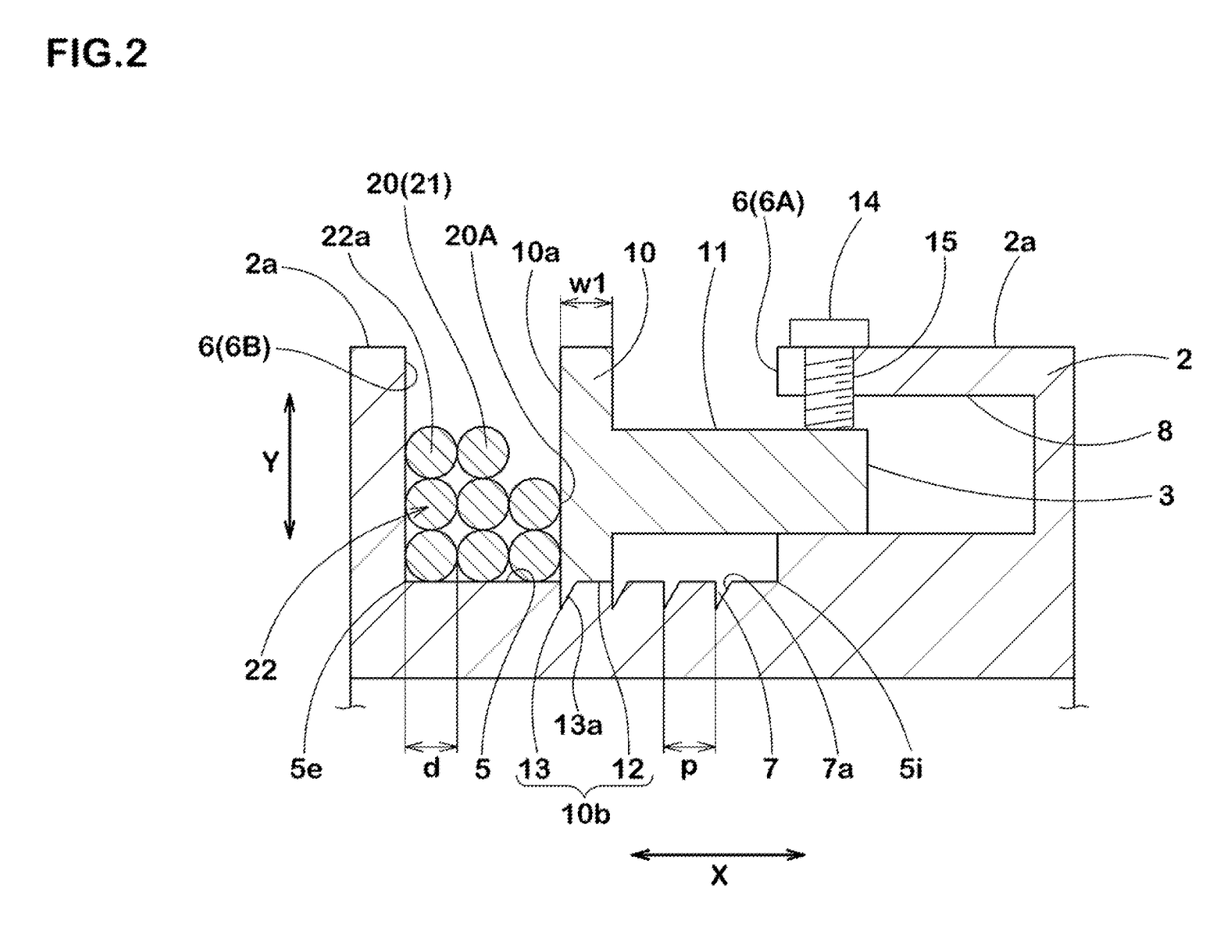
FIG. 2 is a cross-sectional view of the bead core forming former of FIG. 1 in a state where the bead wire is wound.

FIG. 2 is a cross-sectional view of the former 1 in this embodiment, taken orthogonal to a circumferential direction thereof, in which the bead core 20 is formed. As shown in FIG. 2, the bead core 20 in this embodiment includes a wire array 22 formed with one or a plurality of parallel bead wires 21 helically wound by shifting in a width direction of the bead core 20 (hereinafter may be simply referred to as "width direction"). In the bead core 20 in this embodiment, the wire array 22 is stacked in multiple stages in a radial direction of the bead core 20 (hereinafter may be simply referred to as "radial direction"). In each figure, the width direction is indicated by x and the radial direction is indicated by Y.

Although the bead wire 21 is not particularly limited as long as it is non-stretchable, it is preferred that a steel wire coated with rubber is used as the bead wire 21, for example, from the point of view of securing rigidity and formability of a bead portion (not shown in the figures) of the tire.

As shown in FIG. 1, the former 1 in this embodiment is formed in an annular shape extending in the circumferential direction. The former 1 in this embodiment includes a main body portion 2 having a circumferential groove 4 concave from an outer circumferential surface 2a and extending in the circumferential direction for winding the bead wires 21 (shown in FIG. 2), and at least one width adjusting portion 3 for changing a width (w) of the circumferential groove 4 by moving relatively to the main body portion 2. In this specification, the width (w) of the circumferential groove 4 means a width of a region around which the bead wires 21 are wound.

The main body portion 2 is configured to include, for example, a plurality of segments 2A expandable and reducible in the radial direction. Thereby, after the bead wires 21 are wound, the bead core 20 can be easily removed from the circumferential groove 4 of the main body portion 2 by reducing a diameter of the segments 2A. As a means for expanding and reducing the segments 2A, one having a well-known structure (not shown in the figures) is used.

As shown in FIG. 2, the circumferential groove 4 in this embodiment has a groove bottom surface 5 on which the bead wires 21 are placed, a pair of inner side surfaces 6 connecting the groove bottom surface 5 and the outer circumferential surface 2a, and at least one recessed portion 7 extending radially inwardly from the groove bottom surface 5.

The circumferential groove 4 in this embodiment is formed in a rectangular shape in a cross-sectional view orthogonal to the circumferential direction. Note that the circumferential groove 4 is not limited to such a configuration, and for example, the circumferential groove 4 may have a trapezoidal shape (not shown in the figures) with the groove bottom surface 5 continuously inclined to the radial direction from one end 5e to the other end 5i in the width direction.

The groove bottom surface 5 in this embodiment extends substantially continuously in the circumferential direction. The terms "substantially continuously" includes, for example, a case in which a gap (not shown in the figures) or the like is provided between the segments 2A adjacent to each other in the circumferential direction in order to secure a length in the circumferential direction of the bead core 20.

The main body portion 2 in this embodiment includes a concave portion 8 that is recessed from at least one of the inner side surfaces 6 (an inner side surface 6A on the right side in FIG. 2) in a direction away from the circumferential groove 4. Note that the other one of the inner side surfaces 6 in this embodiment (an inner side surface 6B) extends straight in the radial direction without having the concave portion 8 formed thereon.

The concave portion 8 in this embodiment is formed in a rectangular shape in the cross-sectional view.

The groove bottom surface 5 in this embodiment is provided with a plurality of the recessed portions 7 spaced from each other in the width direction. It is preferred that a pitch (p) of the recessed portions 7 in the width direction is set to be the same length as a diameter (d) of the bead wires 21.

The at least one recessed portion 7 has a tapered surface 7a so that a width of the at least one recessed portion 7 increases toward the outside in the radial direction in the cross-sectional view orthogonal to the circumferential direction. Note that a sectional shape of the at least one recessed portion 7 is not limited to such a shape, but may be, for example, a rectangular shape or a semicircular shape.

The at least one width adjusting portion 3 in this embodiment includes a holding portion 10 for holding the bead wires 21 stacked in multiple stages within the circumferential groove 4, and a slide portion 11 connected to the holding portion 10 and having a height smaller than that of the holding portion 10 in the radial direction.

The holding portion 10 in this embodiment is formed so as to have a substantially rectangular shape in the cross-sectional view including a radial direction surface 10a in contact with end surfaces 20A of the bead cores 20 in the width direction and extending in the radial direction, and a width direction surface 10b extending along the groove bottom surface 5.

It is sufficient for the radial direction surface 10a to have a height enough to be at least in contact with the end surfaces 20A of the wire array 22a arranged outermost in the radial direction.

The width direction surface 10b in this embodiment has an abutting surface 12 in contact with the groove bottom surface 5 and a protruding portion 13 to be fitted with any one of the recessed portions 7 in this embodiment. The protruding portion 13 has a tapered surface 13a so that a width of the protruding portion 13 decreases toward the inside of the radial direction. It is preferred that a length w1 of the width direction surface 10b in the width direction is not less than a diameter (d) of the bead wires 21. The length w1 in this embodiment is the same as the diameter (d) of the bead wires 21.

The slide portion 11 in this embodiment is disposed in the concave portion 8. The slide portion 11 is fixed to the main body portion 2 by screw members 14. Specifically, the screw members 14 are screwed into holes 15 provided in the outer circumferential surface 2a located outside the concave portion 8 in the radial direction, therefore, it is possible that the slide portion 11 is fixed to the concave portion 8 by pressure contact. As the screw members 14, various kinds of screws, bolts and the like can be used. At least one screw member 14 is provided in each of the segments 2A, and it is preferred that not less than two screw members 14 are provided in each of the segments 2A in consideration of secure fixing of the at least one width adjusting portion 3.

As shown in FIG. 1, a plurality of the width adjusting portions 3 is provided at intervals in the circumferential direction in this embodiment. The width adjusting portions 3 in this embodiment are each provided in each of the segments 2A of the main body portion 2. Note that the width adjusting portion 3 is not limited to such a configuration, and any number of the width adjusting portion 3 can be provided in each of the segments 2A as long as the bead wires 21 can be wound accurately.

With the former 1 configured as such, the bead cores 20 having different widths can be manufactured by moving the holding portion 10 in the width direction in the circumferential groove 4.

Further, the protruding portion 13 of the holding portion 10 and the at least one recessed portion 7 of the circumferential groove 4 are fitted to each other, it is possible that a position of the width adjusting portion 3 is determined accurately and easily. Furthermore, by providing a plurality of the recessed portions 7 in the width direction, the bead cores 20 having different widths can be manufactured accurately and easily. Further, the slide portion 11 is fixed by the screw member, therefore, it is possible that shape loss of the bead wires 21 while being wound is suppressed securely. Thereby, by using the former 1 in this embodiment, it is possible that the bead cores 20 with different widths are manufactured accurately and easily.

Figure 3A:
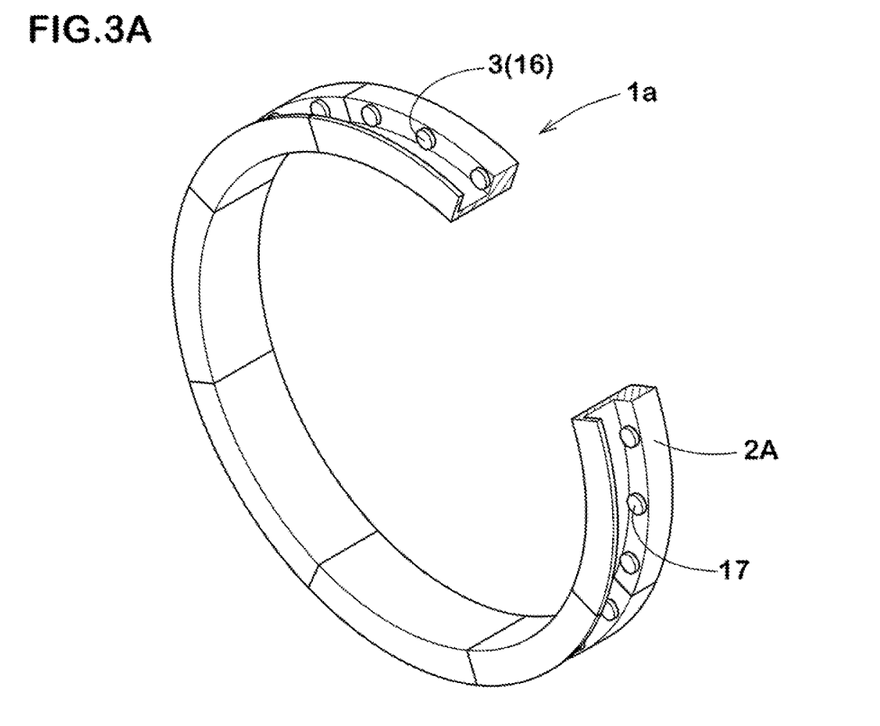
FIG. 3A is a perspective view of the bead core forming former of second embodiment of the present invention.
Figure 3B:
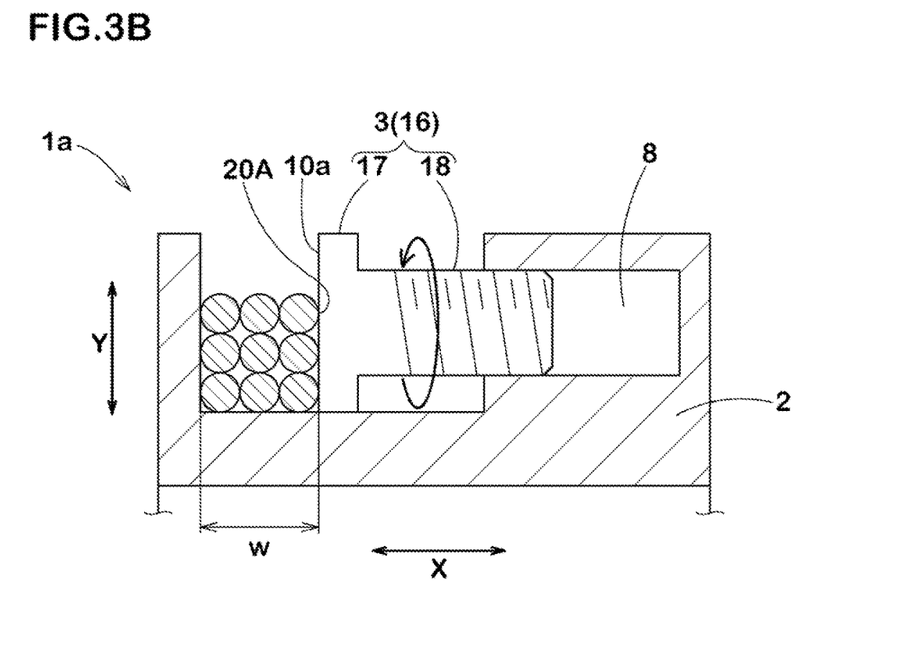
FIG. 3B is a cross-sectional view of the bead core forming former of FIG. 3A.

FIG. 3A and FIG. 3B show a former 1a according to second embodiment. The same reference numbers are assigned to components having the same configuration as those of the former 1 of the first embodiment, and the description thereof is omitted.

In the former 1a in this embodiment, the at least one width adjusting portion 3 is formed by at least one screw member 16. Specifically, the at least one width adjusting portion 3 includes a disk-shaped holding portion 17 disposed in the circumferential groove 4, and a threaded portion 18 connected to the holding portion 17 and screwed to the concave portion 8 of the main body portion 2. The holding portion 17 has the radial direction surface 10a extending in the radial direction and in contact with the end surfaces 20A of the bead cores 20 in the width direction. In the former 1a configured as such, the width (w) of the circumferential groove 4 can be changed and fixed easily by rotating the holding portion 17 of the width adjusting portion 3 around its axis. In the case of this embodiment, the recessed portion 7 described above is omitted. Note that the screw member 16 is not limited to such a configuration and may have a structure capable of moving all the holding portions 17 of the former 1a in the axial direction at once, for example.

Figure 4:
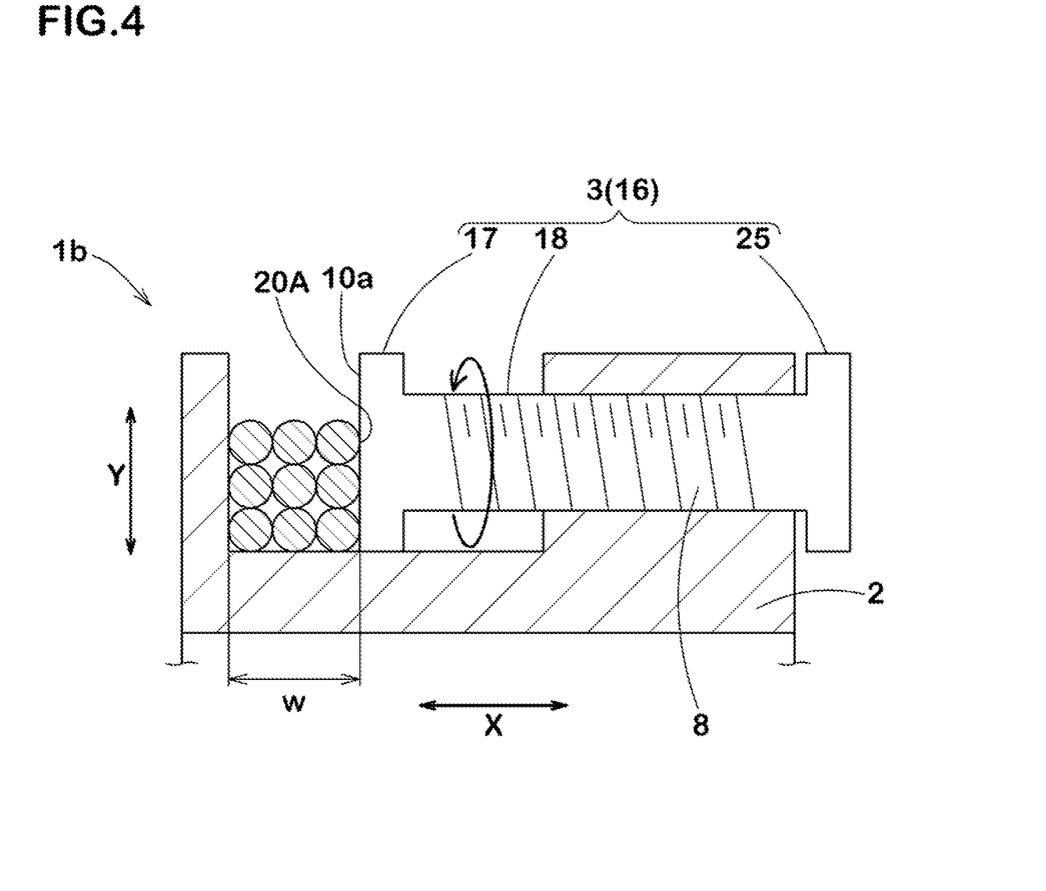
FIG. 4 is a cross-sectional view of the bead core forming former of third embodiment of the present invention.

FIG. 4 shows a former 1b according to third embodiment. The same reference numbers are assigned to components having the same configuration as those of the former 1a of the second embodiment shown in FIG. 3, and the description thereof is omitted. In the former 1b in this embodiment, the at least one width adjusting portion 3 is formed by at least one screw member 16. Specifically, the at least one width adjusting portion 3 has the disk-shaped holding portion 17 disposed in the circumferential groove 4, the threaded portion 18 connected to the holding portion 17 and screwed to the concave portion 8 of the main body portion 2, and a positioning portion 25 connected to the threaded portion 18 and located outside the main body portion 2. In the former 1b of this embodiment, by rotating the positioning portion 25 provided outside the main body portion 2 around an axis of the threaded portion 18, the position of the holding portion 17 in the width direction is determined and fixed.

Figure 5:
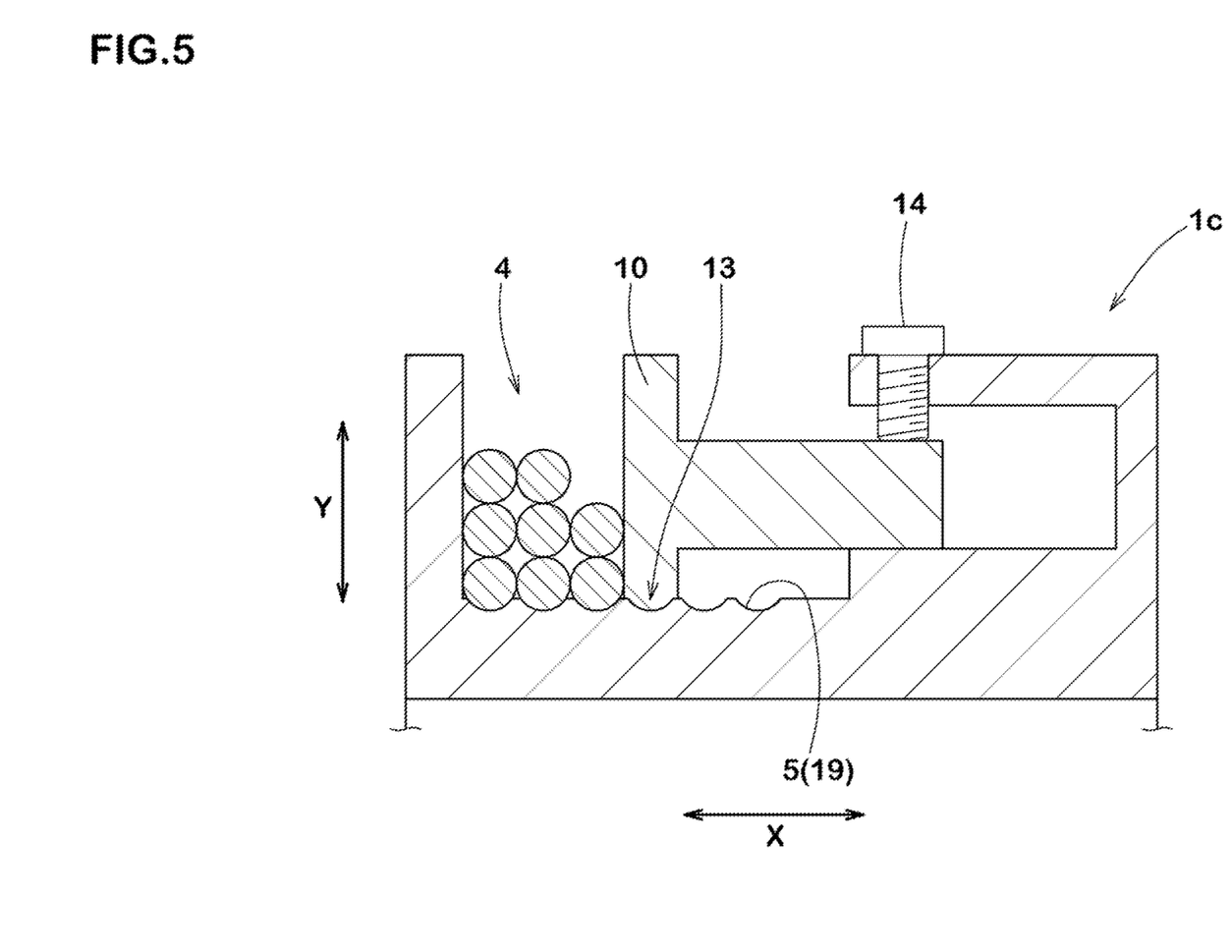
FIG. 5 is a cross-sectional view of the bead core forming former of fourth embodiment of the present invention.

FIG. 5 is a cross-sectional view of a former 1c according to fourth embodiment. The same reference numbers are assigned to components having the same configuration as those of the former 1 of the first embodiment, and the description thereof is omitted. In the circumferential groove 4 of the former 1c of this embodiment, the groove bottom surface 5 on which the bead wires 21 are placed is formed to have at least one small groove portion 19, preferably a plurality of them, having a substantially semicircular shape and a radius of curvature substantially equal to the radius of the bead wires 21. With the at least one small groove portion 19 configured as such, it is possible that the bead wires 21 are easily positioned.

The protruding portion 13 of the holding portion 10 in this embodiment is formed in a semicircular arc shape convex toward the inside in the radial direction so as to fit into the at least one small groove portion 19. Thereby, it is possible that movement of the holding portion 10 in the width direction is effectively constrained.

While detailed description has been made of especially preferred embodiments of the present invention, the present invention can be embodied in various forms without being limited to the illustrated embodiments.

The invention claimed is:

1. An annular bead core forming former for manufacturing a bead core including a wire array in which a bead wire is helically wound in a width direction of the bead core, the bead core forming former comprising:
    a main body portion having an outer circumferential surface with a circumferential groove extending in a circumferential direction for winding the bead wire; and
    at least one width adjusting portion which moves relatively to the main body portion to change a width of the circumferential groove,
    wherein the circumferential groove has a groove bottom surface on which the bead wire is placed, and
    wherein the groove bottom surface is provided with a plurality of recessed portions recessed inwardly in a radial direction of the bead core and arranged in the width direction of the bead core.

2. The bead core forming former according to claim 1, wherein the at least one width adjusting portion has a protruding portion for being alternatively positioned within each of the plurality of recessed portions.

3. The bead core forming former according to claim 2, wherein the protruding portion has a tapered surface so that a width of the protruding portion decreases inwardly in the radial direction.

4. The bead core forming former according to claim 1, wherein the at least one width adjusting portion is fixed to the main body portion with a screw member.

5. The bead core forming former according to claim 4,
    wherein the at least one width adjusting portion has a protruding portion for being alternatively positioned within each of the plurality of recessed portions,
    wherein the screw member is a member different from the protruding portion, and
    wherein the protruding portion protrudes radially inwardly so as to be alternatively fitted within the plurality of recessed portions from radially outside such that a rest of the width adjusting portion other than the protruding portion is positioned radially outside the plurality of recessed portions when the protruding portion is alternatively fitted within the plurality of recessed portions.

6. The bead core forming former according to claim 1, wherein a plurality of the at least one width adjusting portions is provided at intervals in the circumferential direction.

7. The bead core forming former according to claim 1,
    wherein the circumferential groove has a pair of inner side surfaces connecting the groove bottom surface and the outer circumferential surface, and
    wherein the main body portion includes a concave portion that is recessed from at least one of the inner side surfaces in a direction away from the circumferential groove such that the concave portion has an upper surface and a lower surface extending in the width direction of the bead core and facing each other in the radial direction of the bead core.

8. The bead core forming former according to claim 7,
    wherein the width adjusting portion includes a holding portion for holding the bead wire within the circumferential groove and a slide portion connected to the holding portion, and
    wherein the slide portion is disposed in the concave portion so as to be slidable within the concave portion in the width direction of the bead core.

9. The bead core forming former according to claim 8,
    wherein a hole is provided in the outer circumferential surface located radially outside the concave portion, and
    wherein a screw member is screwed into the hole such that the slide portion is fixed to the concave portion by pressure contact.

10. The bead core forming former according to claim 1, wherein each of the plurality of recessed portions has a tapered surface so that a width of the plurality of recessed portion increases outwardly in the radial direction in the cross-sectional view orthogonal to the circumferential direction.

11. The bead core forming former according to claim 1,
    wherein the width adjusting portion includes a holding portion and a slide portion,
    wherein the holding portion holds the bead wire stacked in multiple stages within the circumferential groove, and
    wherein the slide portion is connected to the holding portion and has a height smaller than that of the holding portion in the radial direction.

12. The bead core forming former according to claim 11,
    wherein the holding portion has a rectangular shape in a cross-sectional view of the holding portion and includes a radial direction surface and a width direction surface,
    wherein the radial direction surface is to contact with an end surface of the bead core in the width direction and extending in the radial direction, and wherein the width direction surface extends along the groove bottom surface.

13. The bead core forming former according to claim 12, wherein a length of the width direction surface in the width direction is not less than a diameter of the bead wire.

14. The bead core forming former according to claim 1, wherein each of the recessed portions has a semicircular cross-sectional shape with a radius of curvature equal to a radius of the bead wire.

15. An annular bead core forming former for manufacturing a bead core including a wire array in which a bead wire is helically wound in a width direction of the bead core, the bead core forming former comprising:
  a main body portion having an outer circumferential surface with a circumferential groove extending in a circumferential direction for winding the bead wire; and
  at least one width adjusting portion which moves relatively to the main body portion to change a width of the circumferential groove,
  wherein the circumferential groove has a groove bottom surface on which the bead wire is placed,
  wherein the groove bottom surface has at least one recessed portion recessed inwardly in a radial direction of the bead core,
  wherein the width adjusting portion has a protruding portion for being positioned within the at least one recessed portion,
  wherein the width adjusting portion is fixed to the main body portion with a screw member,
  wherein the screw member is a member different from the protruding portion,
  wherein the protruding portion protrudes radially inwardly so as to be fitted within the at least one recessed portion from radially outside such that a rest of the width adjusting portion other than the protruding portion is positioned radially outside the at least one recessed portion when the protruding portion is fitted within the at least one recessed portion, and
  wherein the groove bottom surface has a plurality of the at least one recessed portion arranged in the width direction of the bead core.

16. An annular bead core forming former for manufacturing a bead core including a wire array in which a bead wire is helically wound in a width direction of the bead core, the bead core forming former comprising:
  a main body portion having an outer circumferential surface with a circumferential groove extending in a circumferential direction for winding the bead wire; and
  at least one width adjusting portion which moves relatively to the main body portion to change a width of the circumferential groove,
  wherein the circumferential groove has a groove bottom surface on which the bead wire is placed,
  wherein the groove bottom surface has at least one recessed portion recessed inwardly in a radial direction of the bead core,
  wherein the width adjusting portion has a protruding portion for being positioned within the at least one recessed portion,
  wherein the width adjusting portion is fixed to the main body portion with a screw member,
  wherein the screw member is a member different from the protruding portion,
  wherein the protruding portion protrudes radially inwardly so as to be fitted within the at least one recessed portion from radially outside such that a rest of the width adjusting portion other than the protruding portion is positioned radially outside the at least one recessed portion when the protruding portion is fitted within the at least one recessed portion,
  wherein the circumferential groove has a pair of inner side surfaces connecting the groove bottom surface and the outer circumferential surface, and
  wherein the main body portion includes a concave portion that is recessed from at least one of the inner side surfaces in a direction away from the circumferential groove such that the concave portion has an upper surface and a lower surface extending in the width direction of the bead core and facing each other in the radial direction of the bead core.

* * * * *